(12) United States Patent
MacMillian et al.

(10) Patent No.: US 8,701,855 B2
(45) Date of Patent: Apr. 22, 2014

(54) FRICTION CLUTCH

(71) Applicant: Schaeffler Technologies AG & Co. KG, Herzogenaurach (DE)

(72) Inventors: Loyal George MacMillian, Karlsruhe (DE); Daniel Redel, Buehl (DE); Gerald Kuestler, Gaggenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/774,782

(22) Filed: Feb. 22, 2013

(65) Prior Publication Data
US 2013/0161147 A1 Jun. 27, 2013

Related U.S. Application Data

(63) Continuation of application No. PCT/DE2011/001519, filed on Jul. 27, 2011.

(30) Foreign Application Priority Data

Aug. 23, 2010 (DE) .......................... 10 2010 035 123
Oct. 5, 2010 (DE) .......................... 10 2010 047 524

(51) Int. Cl.
F16D 13/00 (2006.01)

(52) U.S. Cl.
USPC .................................. 192/113.23; 192/113.2

(58) Field of Classification Search
USPC ....................................................... 192/113.23
See application file for complete search history.

(56) References Cited

U.S. PATENT DOCUMENTS

| 2,198,792 | A | * | 4/1940 | Schjolin | 180/68.2 |
| 4,382,497 | A | | 5/1983 | Sakai et al. | |
| 5,847,275 | A | * | 12/1998 | Kondo et al. | 73/202.5 |
| 2010/0113216 | A1 | * | 5/2010 | Avny et al. | 477/76 |

FOREIGN PATENT DOCUMENTS

| DE | 41 00 091 A1 | 7/1992 |
| DE | 103 38 558 A1 | 3/2004 |
| DE | 10 2007 041 853 A1 | 4/2008 |
| DE | 10 2009 044 385 A1 | 5/2010 |
| EP | 1 862 686 A2 | 12/2007 |
| EP | 1 873 414 A2 | 1/2008 |

* cited by examiner

Primary Examiner — David D Le
Assistant Examiner — Colby M Hansen
(74) Attorney, Agent, or Firm — Lucas & Mercanti, LLP

(57) ABSTRACT

The invention relates to a friction clutch in a motor vehicle, comprising a clutch bell housing (210), at least one air inlet duct (130) arranged on the clutch bell housing for cooling the clutch bell housing, at least one air outlet duct (140) arranged on the clutch bell housing, and at least one temperature sensor (120). The invention further relates to a method for determining a clutch temperature of a friction clutch.

6 Claims, 2 Drawing Sheets

FRICTION CLUTCH

CROSS-REFERENCE TO RELATED APPLICATIONS

This application is a continuation of PCT/DE2011/001519 filed Jul. 27, 2011, which in turn claims the priority of DE 10 2010 035 123.7 filed Aug. 23, 2010 and DE 10 2010 047 524.6 filed Oct. 5, 2010, the priority of these applications is hereby claimed and these applications are incorporated by reference herein.

BACKGROUND OF THE INVENTION

Field of the Invention

The invention relates to a friction clutch and especially a clutch bell housing air cooler, Friction clutches in motor vehicles as a rule have a clutch bell housing. With current clutch temperature models, the bell air temperature in the clutch bell housing might not be calculated with sufficient precision online—i.e., in the vehicle—in a transmission with a dry friction clutch and active cooling. Thus it makes sense to apply a temperature sensor and thereupon to optimize the clutch temperature model.

The clutch temperature model delivers a signal which is used for a protection strategy. The clutch protection strategy protects the clutch from excess heating and thus from effects that appear at higher temperatures, such as fading, thermal shock, etc. Through introduced friction loss, the clutch disks and also the clutch plates and other components of the clutch such as diaphragm springs, reset systems, bearings, etc, become warm. These heated parts become cool, among other locations, also in the bell air—i.e., the air in the clutch bell housing. The be air in turn has a heat transmission path in the direction of the engine, engine compartment and transmission, as is shown in FIG. 1.

The be air temperature can currently be determined in various ways:
1.) A bell air temperature sensor within the dutch bell housing, but without active cooling. This is disclosed by DE 41 00 091 A1 for example.
2.) A temperature sensor on the outer wall outside the clutch bell housing with active ventilation. This is disclosed in DE 10 2009 044 385 A1, for example.
3.) A calculated bell air temperature in dependence on friction loss and on heat-transmission behavior of the vehicle, engine, transmission and the clutch itself in a system without active cooling The known prior art permits no flow simulation online in the vehicle, since currently too high a computational capacity is required. The drawbacks of the individual solutions are the following:
1.) Without active cooling, clutch applicability, and thus vehicle availability, is thermally limited, or the clutch will be thermally overloaded, leading to a shortening of service life.
2.) With a temperature sensor on the outer wall of the bell housing, outside the bell, the value of the bell air temperature can be assessed only with insufficient precision, since the temperature determined on the outer wall of the bell is dependent on the capacity of the bell casting, the heat flux within the engine compartment and also the bell air. This results in the clutch model being imprecise, which leads to a limitation in mobility and availability of the vehicle, or causes an overheating of, or damage to, the clutch.
3.) Calculation of the bell air temperature with active cooling involves increased computational complexity, which requires increased computing performance. By increasing the complexity, rather many input signals are required, which impairs the precision of the model, which leads to a limitation in mobility and availability of the vehicle or can cause an overheating of, or damage to, the clutch.

SUMMARY OF THE INVENTION

The object that is the basis for the present invention is to determine the dutch temperature while using active bell air cooling with increased precision by means of a clutch temperature model.

According to the invention a friction clutch is proposed in a motor vehicle with a clutch bell housing as well as at least one air inlet duct situated on the clutch bell housing and at least one air outlet duct situated on the clutch bell housing and at least one temperature sensor, wherein the temperature sensor in the clutch bell housing is situated at an angular range of 90 degrees to 360 degrees, especially of 180 degrees to 360 degrees, along the circumference of the clutch bell housing proceeding from the air inlet duct in the flow direction of the air fed through the air inlet duct, or wherein the temperature sensor is situated in the air outlet duct. In advantageous fashion, the temperature in the clutch bell housing can thus be determined.

In one preferred embodiment, the inlet duct and/or the outlet duct are/is situated essentially tangentially in the circumferential direction to the clutch bell housing, or placed at a preset angle to the tangent line of the clutch bell housing. The preset angle is selected to be small for reasons of optimized aerodynamics, for example between 0 and 45 degrees, and in an especially preferred embodiment between 0 and 25 degrees.

In a further preferred embodiment, the ends of the inlet duct and/or the outlet duct extend into the clutch bell housing.

In a further preferred embodiment, the ends of the ducts are curved and/or the ends of the ducts have deflection vanes such as, guide vanes in the area of the ends, so that the ends are aerodynamically optimized.

In a further preferred embodiment, the ends terminate flush with the clutch bell housing.

In a further preferred embodiment, provision is made that the temperature sensor situated within the clutch bell housing is placed at a distance from the clutch bell housing wall by a spacing device and/or thermal insulation, such as a ceramic insulator, so that the temperature sensor measures the temperature of the bell air.

In a further preferred embodiment, provision is made that the air fed through the air inlet duct is cooled as compared with the recirculating air of the vehicle, which occurs by means of connection to an air conditioner and/or to the vehicle cooling system and/or to an engine cooling system and/or to a low-temperature circuit.

In a further preferred embodiment, provision is made that the air fed through the air inlet duct is heated as compared with the recirculating air of the vehicle, which occurs by means of connection to the vehicle heating system.

According to the invention, a method is also proposed for determining a dutch temperature of a friction clutch in a motor vehicle, wherein the friction clutch is designed according to the designs implemented above. The method according to the invention makes provision that, by means of a clutch temperature model which takes the values of the at least one temperature sensor, it determines the clutch temperature and by means of the determined clutch temperature controls the active cooling device.

In a preferred embodiment of the method, provision is made that if the sensor fails, either the method is continued by an additional functionally capable temperature sensor, or the active cooling device is run continuously, wherein in this case the clutch temperature is determined using a clutch temperature model which takes no active cooling into account.

In a further preferred embodiment of the method, provision is made that the active cooling device is controlled by means of a transmission control device or by means of an engine control device.

The friction clutch according to the invention, as well as the method according to the invention, has the following advantages:
a) avoiding excessively high computing capacity, or computing capacity which is not available
b) avoiding limited vehicle availability due to a clutch protection strategy that engages too strongly
c) Preventing damage to the clutch because the model is insufficiently precise

DETAILED DESCRIPTION OF THE PREFERRED EMBODIMENTS

Figure 1:
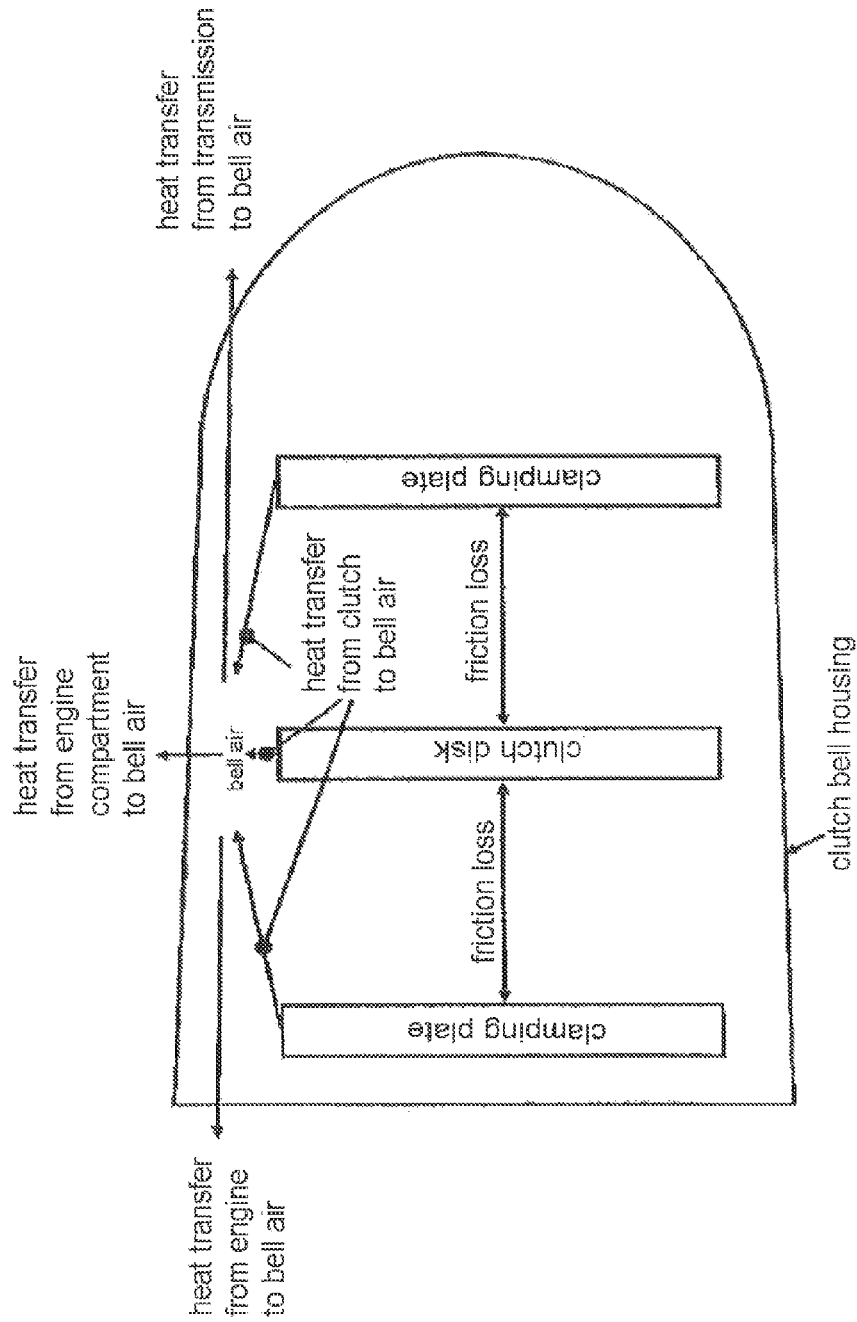
FIG. 1 is a schematic diagram of a prior art clutch bell housing showing heat transmission paths.
Figure 2:
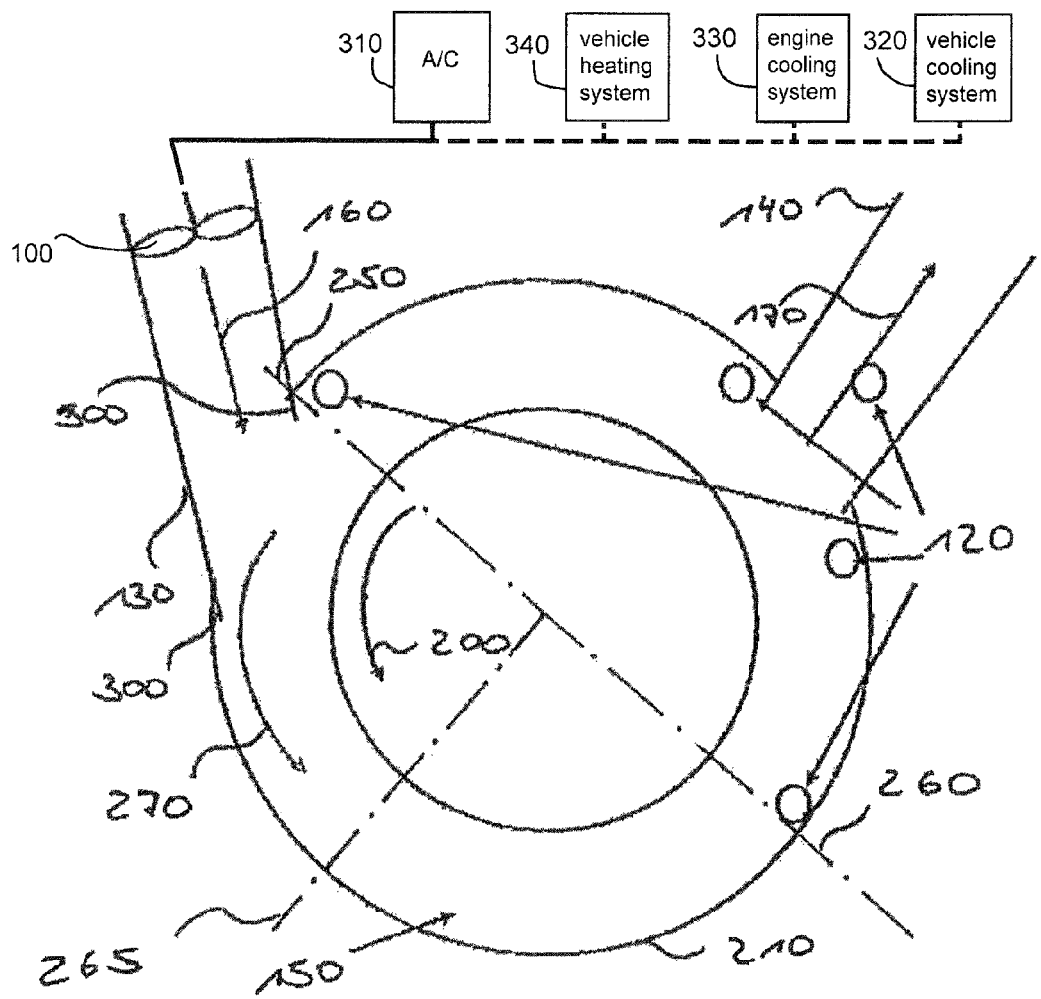
FIG. 2 is a schematic diagram of the friction clutch according to the invention.

For determination of the clutch temperature when using an active bell housing cooling device 100, a temperature sensor 120 is provided within the bell housing air volume 150. By reference number 120, both the temperature sensor and its position are designated. In FIG. 2, several positions are indicated as examples. Especially appropriate sensor positions 120 can be determined using an investigation of the flow behavior within the clutch or the clutch bell housing. As viewed from the inlet duct 130, advantageous sensor positions 120 are the angular range between 90 degrees 265 and 360 degrees 250, especially between 180 degrees 260 and 360 degrees 250, in the flow direction 270 of the air fed through the inlet duct 130 or a sensor 120 in the outlet duct 140. Thus an advantageous measurement position would, generally formulated, be the bell inner air 150, not yet with admixture of the fresh air 160, i.e. not in the direct flow of the admixed outer air 160. Therefore the range of angles from 180 degrees to 360 degrees has an advantage relative to the range of angles from 90 degrees to 360 degrees in that the fresh air 160 has already been more thoroughly mixed with the inner bell air 150. Also, the inlet duct 130 and outlet duct 140 are aerodynamically optimized. As depicted in FIG. 2, this, for example, occurs through ends of the ducts 300 that extend radially into the clutch or the clutch bell housing; through a curvature of the ends 300 extending into the clutch; through deflection vanes such as guide vanes in the area of the ends of the ducts 300, or in the clutch; or a combination of these possibilities. Also it is advantageous for the ends 300 and the clutch bell housing to terminate in flush fashion. The inlet duct 130 and/or the outlet duct 140—especially in the area where they empty into the dutch bell housing—are situated essentially tangentially in the circumferential direction to the dutch be housing or at a preset angle to the tangent line of the clutch bell housing 210. To optimize the aerodynamics, the preset angle is chosen to be small, for example between 0 and 25 degrees.

In the event the sensor fails, there are in principle two possibilities for solution. One is that a second sensor can be provided as a check or as a replacement, and the method runs aided by the second sensor. Another is that if a sensor fails, provision can be made to run the fan of the active cooling device 100 continuously, but with the conventional clutch temperature model—thus assuming that no active cooling is present—to determine the temperature.

Figure 3:
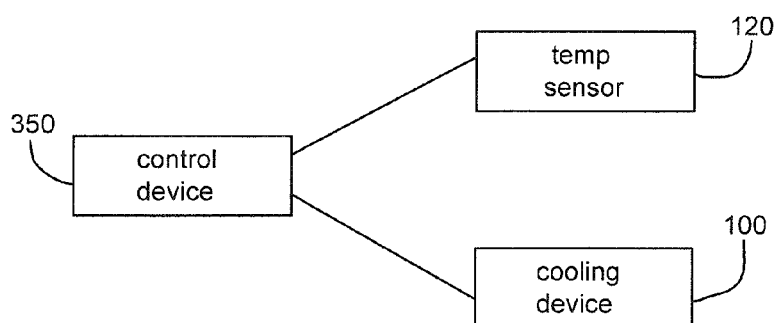
FIG. 3 is a schematic block diagram of a control for the friction clutch of FIG. 2.

The active cooling device 100—which is designed in a preferred embodiment as a fan in FIG. 2—can be controlled by a control device 350 (see FIG. 3), such as the transmission control device or the engine control device. The advantage in actuating by means of the transmission control device is that the active cooling device 100 can react directly to the determined signals of the clutch temperatures.

The device can undergo active cooling 100 in various ways for use with a bell air temperature sensor 120 and optimized temperature model, regardless of whether the auxiliary cooling is generated by a fan, via compressed air through the inlet duct 130 or via suction—for example, through reduced pressure in the outlet duct 140. A possibility also exists to cool the air flow 160—for example by means of connection to the air conditioner 310, or integrating it into the cooling systems of the vehicle 320 or engine 330, for example a low-temperature circuit. Likewise, a combination of the above-named options is provided. Also a possibility exists to heat the air flow 160, for example by connection to a vehicle heating system 340.

Characteristic of this design are meaningful measurement location 120 for the bell air temperature sensor 120 and adaptation of the clutch temperature model. The temperature sensor 120 should not determine the temperature directly on the transmission housing wall or the bell housing wall, but rather measure the pure bell air temperature, which requires a certain distance to or insulation from the bell housing cast material—for example a ceramic insulator between the bell housing cast material and the sensor 120. The sensor cable can be run through an existing actuator duct—such as with a lever actuator—or via another sensor feed.

An actively cooled dutch with an air temperature sensor within the dutch bell housing results in improved cooling behavior of the clutch and in a precise clutch temperature model. A clutch system without a bell air temperature sensor and active cooling can lead to impaired vehicle availability or to thermal overloading of the clutch, since there would be very many parameters to be identified, and thus the complexity could no longer be handled. Determining the flow behavior and the value of the bell air temperature determined thereon on-line would require excessively high computing capacity. The measurement position of the bell air temperature sensor must be determined after an assessment of the aerodynamic circumstances in the clutch bell housing. One possible measurement location which is recommended for this is within the expelled heated air; here the aerodynamic behavior should not result in excessively large changes (such as dead-flow zones) whether the active cooling is switched on or turned off. A possibility exists to actuate the active cooling device either via the engine control device or the transmission control device. There are various options on how to proceed if the sensor fails: conventional calculation without active cooling, wherein the active cooling is in operation, or a second bell air temperature sensor. The sensor should not measure the cast-structure temperature directly, since this would result in inaccuracy of the determined cast-structure temperature. The cable of the sensor can be run via the clutch actuator.

LIST OF REFERENCE SYMBOLS 100 active cooling device
120 advantageous positions for a temperature sensor
130 inlet duct
140 outlet duct
150 clutch bell housing air
160 cool air or fresh air
170 warm air
200 turning direction of clutch
210 clutch bell housing
250 angle of 0 degrees or 360 degrees
260 angle of 180 degrees
265 angle of 90 degrees
270 flow direction of the air fed through the inlet duct
300 ends of the ducts

The invention claimed is:

1. A friction clutch in a motor vehicle, comprising:
a clutch bell housing;
at least one air inlet duct disposed on the clutch bell housing;
at least one air outlet duct disposed on the clutch bell housing;
a temperature sensor in the clutch bell housing arranged one of:
in the clutch bell housing at an angular range of 90 degrees to 360 degrees along a circumference of the clutch bell housing proceeding from the air inlet duct in the flow direction of the air fed through the air inlet duct, and in the air outlet duct;
an active cooling device directing a flow of air through the air inlet duct into the clutch bell housing; and
a control device connected to the active cooling device and the temperature sensor, the control device measuring a temperature in the clutch bell housing the temperature sensor and controlling the active cooling device based on the measured temperature and a first clutch temperature model, and the control device continuously running the active cooling device and determining a clutch temperature based on a second clutch temperature model that takes no active cooling into account when the temperature sensor fails.

2. The friction clutch of claim 1, wherein the angular range is 180 degrees to 360 degrees along the circumference of the clutch bell housing.

3. The friction clutch of claim 1, wherein at least one of the inlet duct and the outlet duct is situated essentially tangentially in a circumferential direction to the clutch bell housing or at a preset angle to a tangent line of the clutch bell housing.

4. The friction clutch of claim 1, wherein ends of at least one of the inlet duct and the outlet duct extend into the clutch bell housing.

5. The friction clutch of claim 1, wherein the temperature sensor situated in the clutch bell housing is placed at a distance from a clutch bell housing wall so that the temperature sensor measures the temperature of air in the clutch bell housing.

6. The friction clutch of claim 1, wherein air fed through the air inlet duct is one of cooled and heated by connection to at least one of an air conditioner, a vehicle heating system, and a low-temperature circuit comprising a vehicle cooling system or an engine cooling system.

* * * * *